United States Patent [19]

Ito et al.

[11] 4,086,327

[45] Apr. 25, 1978

[54] PROCESS FOR REMOVING NITROGEN OXIDES FROM GASEOUS MIXTURES

[75] Inventors: Yukio Ito, Tokyo; Yosiro Yasumoto, Fuchu; Etsuro Masuda, Tokyo; Hiroshi Suzuki, Mitaka, all of Japan

[73] Assignee: Agency of Industrial Science & Technology, Tokyo, Japan

[21] Appl. No.: 731,739

[22] Filed: Oct. 12, 1976

[30] Foreign Application Priority Data

Oct. 17, 1975 Japan .................................. 50-124433

[51] Int. Cl.$^2$ ........................ C01B 21/00; C01B 21/10
[52] U.S. Cl. ..................................... 423/385; 423/235; 423/551
[58] Field of Search ............... 423/351, 385, 388, 551, 423/235

[56] References Cited

U.S. PATENT DOCUMENTS

| | | | |
|---|---|---|---|
| 1,010,177 | 11/1911 | Raschig | 423/388 |
| 2,772,145 | 11/1956 | Joris et al. | 423/385 |
| 2,812,238 | 11/1957 | Quinn et al. | 423/388 |
| 3,329,478 | 7/1967 | Garlet | 423/235 |

*Primary Examiner*—Edward J. Meros

[57] ABSTRACT

Gaseous mixtures containing nitrogen oxides are contacted with an aqueous solution containing sodium sulfite, trisodium imidobissulfate and sodium sulfate while adjusting the pH thereof by sodium hydroxide or sodium carbonate, and sulfur dioxide is contacted therewith simultaneously or thereafter to produce therein disodium imidobissulfate and sodium hydrogensulfate, and then sodium hydroxide is added therein to deposit sodium sulfate 10 hydrate firstly and trisodium imidobissulfate 1 hydrate secondly, and thereafter the mother liquor is recycled as the absorption medium for nitrogen oxides.

6 Claims, 1 Drawing Figure

(TSIS: trisodium imidobissulfate)

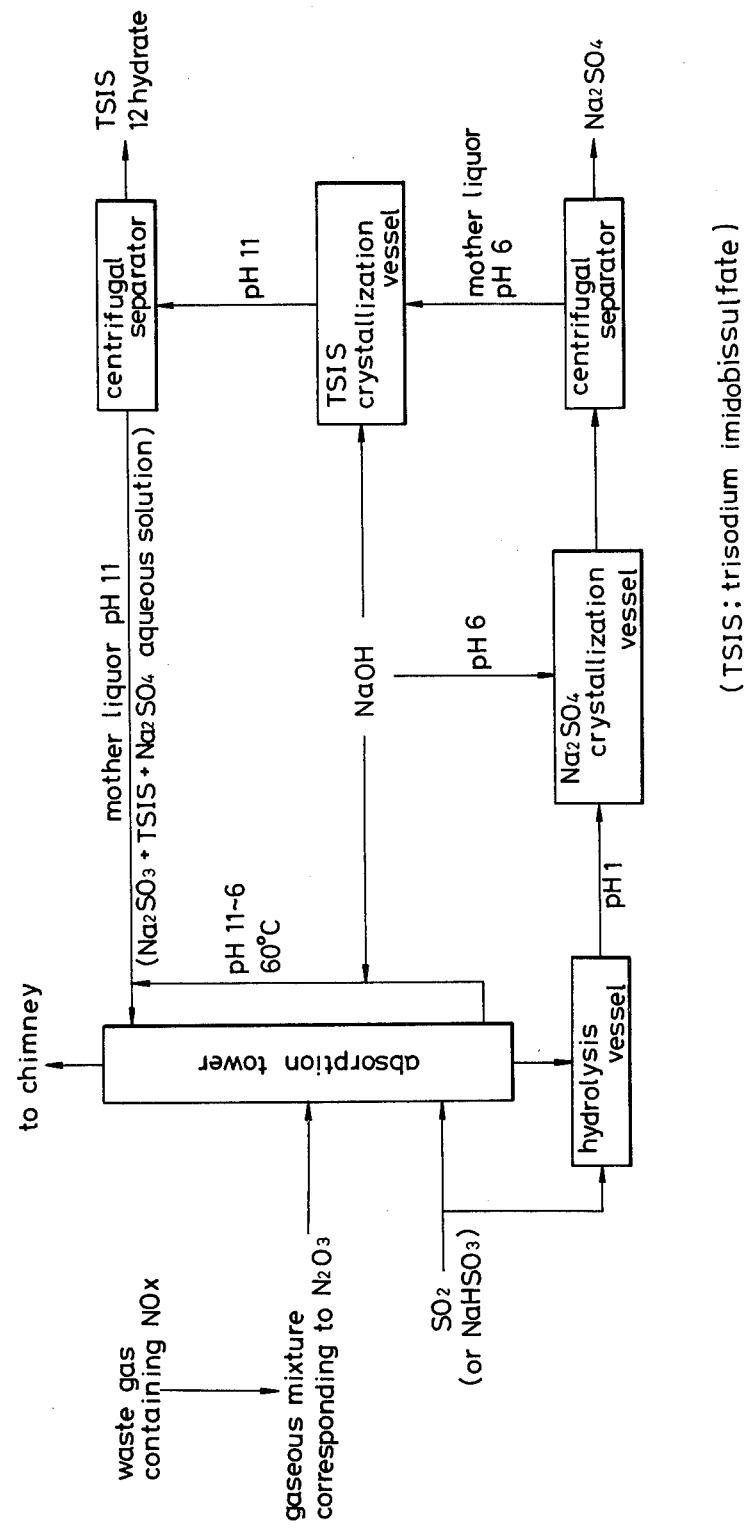

PROCESS FOR REMOVING NITROGEN OXIDES FROM GASEOUS MIXTURES

BACKGROUND OF THE INVENTION

The present invention relates to a process for removing and recovering nitrogen oxides from gaseous mixtures in relation to prevention of air pollution. Especially, the present invention relates to a wet process wherein nitrogen oxides (herein after denoted as $NO_x$) are effectively absorbed, the absorbed components are recovered as useful compounds and the absorption medium can be easily recycled.

DESCRIPTION OF THE PRIOR ART

In recent years, air pollution has become critical and environmental basis for $NO_x$, which are shown as regulation values such as concentration regulation value and total regulation value, have become increasingly severe. Accordingly, an efficient and practical process for the removal of $NO_x$ in gaseous mixtures emitted as waste or by-products by numerous devices which employ combustion processes, such as thermal power plants and chemical plants, has been very much needed.

Heretobefore, various methods have been proposed to remove $NO_x$ (for example, Kagaku Kogyo, Vol. 25, No. 10, 1123 – 1160 (1974). Among them, wet process of absorbing $NO_x$ by aqueous alkali solution is more practical in view of recovering $NO_x$ as useful components. In this wet process, it has been well known that $NO_x$ is quite easily absorbed in the form of dinitrogen trioxide and, therefore, $NO_x$ is previously adjusted in the form of $N_2O_3$ (the molar ratio of $NO : NO_2 = 1 : 1$). However, separation and utilization techniques of nitrite which is produced by absorption have not yet been established.

An object of the present invention is to solve such a problem in the conventional wet process.

Another object of the present invention is to provide a highly efficient wet process in which $NO_x$ is easily absorbed and the absorbed components are easily separated and recovered.

A further object of the present invention is to provide an economically feasible process for preparing trisodium imidobissulfate as by-product which is a new remarkable builder for detergent in place of sodium tripolyphosphate.

A still further object of the present invention will be appear from the description hereinafter.

SUMMARY OF THE INVENTION

The objects of the present invention are attained by the following process.

An aqueous solution containing sodium sulfite, trisodium imidobissulfate and sodium sulfate is used as an absorption medium. Gaseous mixtures containing $NO_x$, previously adjusted in the form of nearly $N_2O_3$, are introduced together with sulfur dioxide into the absorption medium while adjusting the pH of the system, or sodium hydrogensulfite is added into the absorption medium in place of sulfur dioxide to produce disodium imidobissulfate and sodium hydrogensulfate in the system. Next, the system is neutralized by adding sodium hydroxide and thereby, firstly sodium sulfate 10 hydrate is deposited and separated from the system and then sodium hydroxide is further added into the system or mother liquor and, thereby, secondly trisodium imidobissulfate 12 hydrate is deposited and separated from the system. The remained mother liquor is again used as the absorption medium for $NO_x$.

BRIEF DESCRIPTION OF THE DRAWING

FIG. 1 is a drawing showing a typical flow sheet of the process according to the present invention.

DESCRIPTION OF THE PREFERRED EMBODIMENT

The process according to the present invention can be applied to various gaseous mixtures containing $NO_x$, such as $NO$, $N_2O_3$, $NO_2$, emitted as waste or by-products by numerous stationary sources such as nitric acid plants, metal surface treatment plants, thermal power plants and the like.

As is well known hereinbefore, the composition of $NO_x$ in gaseous mixtures may be previously adjusted to nearly $N_2O_3$. In order to adjust the composition of $NO_x$, for instance, nitrogen dioxide produced by ammonia oxidation method can be supplied thereto, a part of nitric oxide therein can be oxidized by ozone-oxidation method, active carbon- or metal-catalyzed oxidation method and the like to convert to $N_2O_3$, or an excess of nitrogen dioxide therein can be absorbed into water.

These gaseous mixtures containing $NO_x$ in the gas composition of nearly $N_2O_3$ are introduced together with sulfur dioxide into the aqueous solution containing sodium sulfite, trisodium imidobissulfate and sodium sulfate while adjusting the pH thereof. The amount of each component of the absorption medium may be easily selected so as to preferably carry out the following reactions.

For instance, in the initial stage, the absorption medium contains preferably trisodium imidobissulfate of saturated concentration, sodium sulfate of saturated concentration and sodium sulfite of 2 to 12 weight %. The temperatures of absorption medium are not limited, but the usual range of temperatures for absorption is between about 10° C and 80° C.

The pH of absorption medium may be adjusted so as to preferably carry out the following reactions. The usual range of pH for absorption is between about 6 and 11.

After absorption, the pH of the system is adjusted preferably to about 8 – 6 and, thereby, sodium nitrite and sodium hydrogensulfite which are produced in accordance with the following reactions (1) – (4) are converted to trisodium nitridotrissulfate, disodium imidobissulfate and sodium hydrogensulfate in accordance with the following reaction (7). The absorption step may be operated using one-stage or multi-stage absorption tower. The reaction (7) is carried out more preferably at about 40° – 60° C. Formation of sodium nitrite $$2(NaSO_3)_2NNa + N_2O_3 + H_2O \rightarrow 2NaNO_2 + 2(NaSO_3)_2NH \quad (1)$$

$$2Na_2SO_3 + N_2O_3 + H_2O \rightarrow 2NaNO_2 + 2NaHSO_3 \quad (2)$$

Formation of sodium hydrogensulfite $$(NaSO_3)_2NNa + SO_2 + H_2O \rightarrow NaHSO_3 + (NaSO_3)_2NH \quad (3)$$

$$Na_2SO_3 + SO_2 + H_2O \rightarrow 2NaHSO_3 \quad (4)$$

Reaction when the pH is adjusted $$(NaSO_3)_2NH + NaOH \rightarrow (NaSO_3)_2NNa + H_2O \quad (5)$$

$$2(NaSO_3)_2NH + Na_2CO_3 \rightarrow 2(NaSO_3)_2NNa + CO_2 + H_2O \quad (5')$$

$$NaHSO_3 + NaOH \rightarrow Na_2SO_3 + H_2O \quad (6)$$

$$2NaHSO_3 + Na_2CO_3 \rightarrow 2Na_2SO_3 + CO_2 + H_2O \quad (6')$$

Reaction of nitrite and hydrogensulfite $$NaNO_2 + 2NaHSO_{3\,+\,SO2} \rightarrow (NaSO_3)_3N + H_2O \rightarrow (NaSO_3)_2NH + NaHSO_4 \quad (7)$$

When the above reactions are carried out in the presence of excess sulfite, side reaction which produces hydroxylamine derivatives is prevented and the reaction proceeds in accordance with the reaction (7). In the reaction (7), sulfur dioxide is concerned in the reaction in the form of sodium hydrogensulfite and, therefore, sodium hydrogensulfite can be added in place of sulfur dioxide. In order to carry out the reaction in the presence of excess sulfite, the feeding amounts of $NO_x$, sulfur dioxide and sodium hydroxide are preferably adjusted so that the molar ratios of $N_2O_3:SO_2:NaOH$ are within $1:6:7 - 1:9:10$.

Especially, their molar ratios of about $1:7:8$ are most preferable. Sulfur dioxide or sodium hydrogensulfite obtained in the removal of sulfur components from heavy oil or waste gas may be used in the process according to the present invention. Sulfur dioxide or sodium hydrogensulfite may be fed separately from or simultaneously with $NO_x$ into the absorption medium.

The reaction (7) is preferably carried out in two-stage. In this case, the reaction is firstly stopped at about pH6, to obtain the system in which a large amount of nitridotrissulfate is present, and then the reaction is completed at about pH1, for which a small amount of sulfur dioxide or sulfuric acid may be added into the system.

Disodium imidobissulfate produced in the reaction (7) tends to hydrolyze in accordance with the following reaction when the pH is lowered. In order to prevent such a hyydrolysis, the above two-stage reaction is more convenient.

$$(NaSO_3)_2NH + H_2O \rightarrow NaSO_3NH_2 + NaHSO_4$$

In case the above reaction (7) is stopped at about pH6, the more the amount of sulfite, the more the amount of nitridotrissulfate and the less the amount of imidobissulfate.

However, nitridotrissulfate is easily hydrolyzed at about pH 1 to produce imidobissulfate and hydrogensulfate. When the reaction (7) is completed and, thereby, the reaction system is converted to the aqueous solution containing disodium imidobissulfate and sodium hydrogensulfate, the reaction system is neutralized by adding sodium hydroxide, preferably as early as possible.

This neutralization is carried out in order to deposit and separate out sodium sulfate 10 hydrate. The neutralizaton is carried out preferably at about pH 4 - 7, more preferably at about pH 6. Over pH 7, trisodium imidobissulfate tends to deposit together with sulfate and, therefore, the pH higher than 7 is not preferable.

Sodium sulfate 10 hydrate is likely to be supersaturated and is difficult to deposit. Therefore, it is preferable to add seed crystal in order to deposit it.

After depositing and separating sodium sulfate 10 hydrate from the reaction system or mother liquor, sodium hydroxide is added into the mother liquor to deposit trisodium imidobissulfate 12 hydrate. This step is carried out by adjusting the pH to over 8, most preferably to 10.9.

Trisodium imidissulfate 12 hydrate is also likely to be supersaturated and, therefore, it is preferable to add seed crystal in order to deposit it. In case the above mentioned molar rations of $N_2O_3 : SO_2 : NaOH$ are about $1 : 7 : 8$, sodium sulfite does not deposit, but in case the molar ratios of $SO_2$ and $NaOH$ are remarkably higher than above, the amount of sulfite in the reaction system is increased and a part of it tends to deposit together with trisodium imidobissulfate. However, solubility of trisodium imidobissulfate to water is remarkably high at about 40° C and remarkably low at temperatures lower than 10° C and, therefore, they can be easily separated each other by recrystalization utilizing above differences in solubility.

Trisodium imidobissulfate 12 hydrate thus obtained may be converted to its 1 hydrate by dehydration. The conversion of trisodium imidobissulfate 12 hydrate to its 1 hydrate can be conducted by various methods.

For instance, trisodium imidobissulfate 12 hydrate is dissolved in water by heating at about 50° C and followed by spray-drying at a temperature more than 42.3° C, or trisodium imidobissulfate 12 hydrate is evaporated over the same temperature in vacuum evaporator.

The mother liquor separated therefrom trisodium imidobissulfate is reused as the absorption medium for $NO_x$ by adusting the composition, if necessary.

As is mentioned above, the present invention is to provide an efficient process for removing and recovering $NO_x$ of the gaseous composition corresponding to $N_2O_3$ by utilizing the reaction of nitrite and hydrogensulfite. According to the present invention, the mother liquor or the aqueous solution containing sodium sulfite, trisodium imidobissulfate and sodium sulfate is easily recycled and the reaction products are efficiently recovered as trisodium imidobissulfate 12 hydrate and sodium sulfate 10 hydrate separately both of which are of easily separable.

Trisodium imidobissulfate is a compound which draws the attention of the chemical fields as a new builder for detergents in place of sodium tripolyphosphate. According to the present invention, such a useful compound can be economically manufactured as the by-product in the effective removal process of $NO_x$.

Of course, the present invention can be utilized exclusively as the manufacturing method of trisodium imidobissulfate by using dinitrogen trioxide produced by chemical process such as ammonia oxidation, independently of air pollution control.

Hereinafter, the present invention is explained by Examples in more detail.

EXAMPLE 1

Into an absorption medium containing 0.45 kg of sodium sulfite, 0.46 kg of trisodium imidobissulfate, 0.94kg of sodium sulfate and 8.15 l of water, sodium hydroxide was added to adjust the pH. The absorption medium thus obtained was poured and circulated in absorption tower, and waste gas containing 2,500 ppm of $NO_x$ emitted from nitric acid plant ($NO_2/NO + NO_2 = 0.4$) was introduced thereto and then sulfur dioxide which had been obtained by combustion of sulfur recovered from heavy oil was introduced.

Absorption of sulfur dioxide was conducted in three stages. Sodium hydroxide was added so as to adjust the pH of absorption medium in the first stage absorption tower to 6 - 7.5, the pH in the second tower to 7.5 - 9 and the pH in the third tower to 9 - 11. Water corresponding to water lost by evaporation was supplied. The temperature of absorption medium was adjusted to 60° C. The feeding amount of sulfur dioxide and the discharging amount of the reaction solution were adjusted so that the concentrations of hydrogen sulfite and imidobissulfate + nitridotris sulfate in the reaction solution of pH 6 discharged from the first tower were 0.23 mol., 0.9 mol/1 kg, respectively.

Into the reaction solution of pH 6, a small amount of sulfur dioxide was added to adjust the pH to about 1, and immediately an aqueous solution of 20% of sodium hydroxide was added to adjust the pH to about 6. Then, at the room temperature, seed crystal was added and stirred to deposit sodium sulfate 10 hydrate.

Sodium sulfate 10 hydrate thus deposited was separated, and then the aqueous solution of 25% of sodium hydroxide was added into the mother liquor to adjust the pH to about 10.9 and seed crystal was added and stirred to deposit trisodium imidobissulfate 12 hydrate.

From 1 kg of about reaction solution of pH 6, 0.26kg of sodium sulfate 10 hydrate and 0.37 kg of trisodium imidobissulfate 12 hydrate were obtained. They had the purities of 95%, respectively. The mother liquor was reused as the absorption medium.

EXAMPLE 2

Waste gas containing 200 ppm of $NO_x$ (NO 90% and $NO_2$ 10%) and 1,200 ppm of sulfur dioxide, emitted from heavy oil-fired thermal power plant, was firstly treated in accordance with the conventional sodium hydroxide absorption method to remove sulfur dioxide as sodium hydrogensulfite. Then, nitrogen dioxide obtained by ammonia oxidation method was mixed therewith so as to adjust the composition of $NO_x$ in the gaseous mixtures to nearly $N_2O_3$ and the resulted gaseous mixtures were fed into the absorption tower.

In the absorption tower the absorption medium set forth in Example 1 had been previously circulated and the pH was adjusted by sodium hydroxide and an aqueous solution of sodium hydrogensulfite was added in order to carry out the absorption reaction.

The absorption of $NO_x$ which has the composition of dinitrogen trioxide was conducted by dividing the pH of the absorption medium to three stages in the same manner as the case of absorption of sulfur dioxide in Example 1. The temperature of absorption medium was adjusted to 60° C. The feeding amount of sodium hydrogensulfite and the discharging amount of the reaction solution were adjusted so that the concentrations of hydrogensulfite and imidobissulfate + nitridotris sulfate in the reaction solution of pH 6 discharged from the first tower were 0.23 mol, 0.9 mol/1 kg, respectively.

Into the reaction solution of pH 6, a small amount of sulfuric acid was added to adjust the pH to about 1, and then sodium hydroxide was added in the same manner set forth in Example 1 and, thereby, sodium sulfate 10 hydrate and trisodium imidobissulfate 12 hydrate were deposited and separated.

From 1 kg of the reaction solution of pH 1, 0.31 kg of sodium sulfate 10 hydrate and 0.35 kg of trisodium imidobissulfate 12 hydrate were obtained, purities of which were 95%, respectively.

What is claimed is:

1. A process for removing nitrogen oxides from gaseous mixtures and which comprises the steps of (1) contacting gaseous mixtures containing nitrogen oxides with an aqueous absorption solution containing sodium sulfite, trisodium imidobissulfate and sodium sulfate while adjusting the pH of the solution to 6 - 11 with sodium hydroxide or sodium carbonate such that nitrogen oxides are absorbed; (2) simultaneously with or subsequent to (1), contacting said aqueous solution with sulfur dioxide or sodium hydrogensulfite to produce disodium imidobissulfate and sodium hydrogensulfate; (3) adding sodium hydroxide to the reaction solution formed in (2) to precipitate sodium sulfate 10 hydrate, firstly, and trisodium imidobissulfate 12 hydrate, secondly; (4) separating the sodium sulfate 10 hydrate and trisodium imidobissulfate 12 hydrate from the mixture formed in (3) to produce a mother liquor; and (5) recycling the mother liquor for use as the absorption solution for nitrogen oxides.

2. The process according to claim 1, in which the nitrogen oxides absorbed in (1) have a composition corresponding substantially to the composition of $N_2O_3$.

3. The process according to claim 1, in which the pH of the absorption solution after absorption of nitrogen oxides in (1) is lowered to about 1 by the addition of sulfur dioxide or sulfuric acid to produce disodium imidobissulfate and sodium hydrogensulfate.

4. The process according to claim 1, in which the amounts of nitrogen oxides, sulfur dioxide or sodium hydrogensulfite and sodium hydroxide to be added are within the range corresponding to the molar ratios of $N_2O_3 : SO_2 : NaOH = 1 : 6 : 7 - 1 : 9 : 10$.

5. The process according to claim 1, in which the sodium hydroxide is added to the reaction solution formed in (2) to adjust the pH to about 4 - 7 to precipitate and separate sodium sulfate 10 hydrate and then additional sodium hydroxide is added to adjust the pH to over 8 to precipitate and separate trisodium imidobissulfate from the reaction solution.

6. The process according to claim 1, in which dinitrogen trioxide obtained by ammonia oxidation method is used in place of the gaseous mixtures containing nitrogen oxides.

* * * * *